United States Patent
Dolinsky et al.

(10) Patent No.: US 11,218,361 B2
(45) Date of Patent: Jan. 4, 2022

(54) SYSTEM, METHOD, APPARATUS, AND COMPUTER PROGRAM PRODUCT FOR ENABLING MANAGEMENT OF A CONVERGED INFRASTRUCTURE THROUGH A USER INTERFACE

(71) Applicant: VCE Company, LLC, Richardson, TX (US)

(72) Inventors: Todd J. Dolinsky, Chapel Hill, NC (US); Jonathan Fontanez, Raleigh, NC (US); Nicholas A. Hansen, Willow Spring, NC (US); Joshua L. Bonczkowski, Apex, NC (US)

(73) Assignee: EMC IP Holding Company LLC, Round Rock, TX (US)

( * ) Notice: Subject to any disclaimer, the term of this patent is extended or adjusted under 35 U.S.C. 154(b) by 143 days.

(21) Appl. No.: 14/132,565

(22) Filed: Dec. 18, 2013

(65) Prior Publication Data
US 2015/0172117 A1 Jun. 18, 2015

(51) Int. Cl.
*H04L 12/24* (2006.01)

(52) U.S. Cl.
CPC ...... *H04L 41/0803* (2013.01); *H04L 41/0233* (2013.01); *H04L 41/0893* (2013.01); *H04L 41/22* (2013.01)

(58) Field of Classification Search
CPC .............................. H04L 41/0813; H04L 41/08
See application file for complete search history.

(56) References Cited

U.S. PATENT DOCUMENTS

| 8,583,769 | B1 * | 11/2013 | Peters | ..................... G06F 9/541 709/221 |
| 2002/0052938 | A1 * | 5/2002 | Kanemitsu | .......... H04L 41/0253 709/220 |
| 2003/0028624 | A1 * | 2/2003 | Hasan | ................. H04L 41/0213 709/220 |
| 2004/0133689 | A1 * | 7/2004 | Vasisht | ................. H04W 28/18 709/228 |
| 2006/0242114 | A1 * | 10/2006 | Arrouye | .............. G06F 9/44505 |

(Continued)

FOREIGN PATENT DOCUMENTS

EP 2110990 A1 10/2009

OTHER PUBLICATIONS

International Search Report and Written Opinion for International Application No. PCT/US2014/066603 dated Mar. 10, 2015.

*Primary Examiner* — Philip J Chea
*Assistant Examiner* — Wuji Chen
(74) *Attorney, Agent, or Firm* — Womble Bond Dickinson (US) LLP

(57) ABSTRACT

A system, method, apparatus, and computer program product for enabling management of a converged infrastructure are disclosed. A method may include determining components of the converged infrastructure whose configurations need to be modified in order to modify the configuration of the converged infrastructure in accordance with a received command to modify the configuration of the converged infrastructure. The method may also include modifying the configuration of each of the determined components to modify the configuration of the converged infrastructure in accordance with the received command.

16 Claims, 9 Drawing Sheets

(56) References Cited

U.S. PATENT DOCUMENTS

| | | | | |
|---|---|---|---|---|
| 2007/0118628 A1* | 5/2007 | Kumar | .............. | H04L 41/082 709/221 |
| 2010/0042705 A1* | 2/2010 | Helman | .............. | G06F 3/0622 709/221 |
| 2011/0143743 A1* | 6/2011 | Pollakowski | .......... | H04L 41/082 455/422.1 |
| 2011/0173302 A1* | 7/2011 | Rider | .............. | G06F 9/44505 709/220 |
| 2011/0289304 A1* | 11/2011 | Peters | .............. | H04L 41/0836 713/1 |
| 2012/0054681 A1* | 3/2012 | Cort | .............. | G06F 3/048 715/816 |
| 2013/0297772 A1* | 11/2013 | Ashok | .............. | H04L 67/10 709/224 |
| 2014/0047085 A1* | 2/2014 | Peters | .............. | G06F 9/541 709/221 |

* cited by examiner

602 — In [23]: vblock.disable_telnet()
255.255.255.20 before modification: Not Enabled
255.255.255.20 after modification: Not Enabled
255.255.255.21 before modification: Enabled
604 — 255.255.255.21 after modification: Not Enabled
255.255.255.22 before modification: Not Enabled
255.255.255.22 after modification: Not Enabled
255.255.255.23 before modification: Not Enabled
255.255.255.23 after modification: Not Enabled
https://255.255.255.30/nuova admin Vc3m01@b
vcemo6140A ==> <?xml version="1.0" ?><configConfMos cookie="1378829080/fa096376-5029-4e6e-ae70-ce7e9e78380f" inHierarchical="false"><inConfigs><pair key="sys/svc-ext/telnet-svc"><commTelnet adminState="disabled" dn="sys/svc-ext/telnet-svc" status="modified"/></pair></inConfigs></configConfMos>
606 — vcemo6140A <== <configConfMos cookie="1378829080/fa096376-5029-4e6e-ae70-ce7e9e78380f" response="yes"> <outConfigs> <pair key="sys/svc-ext/telnet-svc"> <commTelnet adminState="disabled" descr="Telnet Server" dn="sys/svc-ext/telnet-svc" intId="35692" name="telnet" operPort="23" policyLevel="0" policyOwner="local" port="23" proto="tcp" status="modified"/> </pair> </outConfigs>
</configConfMos>
608 — Telnet disabled
610 — In [24]:switch.run_commands(["show telnet server"])
Out[24]: 'show telnet server\r\r\ntelnet service not enabled\r\n\rvcemo9148B#

FIG. 6

```
In [21]: switch.connect()
Connecting to 255.255.255.21...

Line-buffered terminal emulation. Press F6 or ^Z to send EOF.

vcemo9148B# show snmp server
Show snmp server
            <
% Invalid command at '^' marker.
vcemo9148B# show telnet server
Show telnet server
Telnet service enabled
vcemo9148B# ^Z

*** EOF ***

Returning to Converged Shell
```

FIG. 7

802 {
In [22]: sw
switch        switchRest switches

804 {
In [22]: switch.r
switch.reset         switch.run_commands
In [22]: switch.run_commands(["show telnet server"])
Out [22]: 'show telnet server\r\r\ntelnet service enabled\r\n\rvcemo9148B#

FIG. 8

```
log file from vshell.convergedclient import ConvergedClient
client = ConvergedClient()
client
host = ConvergedHost("comp-97.vcemo.lab", "admin","password")
help(host)
client.add_host(host)
vblocks = client.get_vblocks()
vblocks
vblock = vblocks[0]
vblock
vblock.toxml()
print vblock.toprettyxml()
print vblock
vblock.serialNum
vblock.storage
help(vblock)
switches = vblock.get_switches()
switches
switch = switches[1]
switch
print switch
switch.ipAddress
switch.connect()
switch.run_commands(["show telnet server"])
vblock.disable_telnet()
switch.run_commands(["show telnet server"])
show
```

FIG. 9

SYSTEM, METHOD, APPARATUS, AND COMPUTER PROGRAM PRODUCT FOR ENABLING MANAGEMENT OF A CONVERGED INFRASTRUCTURE THROUGH A USER INTERFACE

FIELD OF THE DISCLOSURE

Aspects of the disclosure relate to converged infrastructure computing technology and, more particularly, to a system, method, apparatus, and computer program product for enabling management of a converged infrastructure through a user interface.

BACKGROUND

Converged infrastructure computing is rapidly gaining in popularity, as more and more entities deploying IT platforms are choosing to deploy converged infrastructure systems as part of an integrated information technology (IT) solution. In this regard, converged infrastructure packages multiple IT components, such as servers, data storage devices, networking equipment, and software for IT infrastructure management into a single, optimized computing solution. The integrated solution provided by a converged infrastructure can reduce complexity of deployment, increase IT infrastructure reliability, and reduce management costs compared to conventional IP platforms assembled from individually acquired and assembled components and software packages, as converged infrastructure can provide an integrated set of components selected and assembled by a single vendor into an integrated platform providing guaranteed component interoperability and software compliance. Moreover, converged infrastructure can provide an integrated pool of computing, storage, and networking resources (e.g., a cloud-based computing model) that can be shared by multiple applications and/or users.

However, management of converged infrastructures continues to be problematic for system administrators. In this regard, while converged infrastructures offer a "converged" platform, management of a converged infrastructure continues to require management of individual components of the converged infrastructure in a piecemeal fashion on a component-by-component basis. The inconvenience of managing components of a converged infrastructure on a component-by-component basis can be further exacerbated, as in many converged infrastructures, various components have different interfaces and command sets. For example, various secure shell (SSH) commands may be used to access and configure a switch; an extensible markup language (XML) application programming interface (API) may be used to access and configure a compute layer component; and a vSphere API may be used to access and configure a virtualization layer component. Accordingly, managing a converged infrastructure using present techniques can be time consuming and error prone.

SUMMARY

A system, method, apparatus, and computer program product for enabling management of a converged infrastructure through a user interface are disclosed. Some such disclosed embodiments enable management of a converged infrastructure in a converged manner as a single logical entity rather than on a component-by-component basis. For example, a method in accordance with some example embodiments may include determining a plurality of components of the converged infrastructure whose configurations need to be modified in order to modify the configuration of the converged infrastructure in accordance with a received command to modify the configuration of the converged infrastructure. The method may also include modifying the configuration of each of the determined plurality of components to modify the configuration of the converged infrastructure in accordance with the received command.

It will be appreciated that the above Summary is provided merely for purposes of summarizing some example embodiments so as to provide a basic understanding of some aspects of the disclosure. As such, it will be appreciated that the above described example embodiments are merely examples of some embodiments and should not be construed to narrow the scope or spirit of the disclosure in any way. It will be appreciated that the scope of the disclosure encompasses many potential embodiments, some of which will be further described below, in addition to those here summarized. Further, other aspects and advantages of embodiments disclosed herein will become apparent from the following detailed description taken in conjunction with the accompanying drawings which illustrate, by way of example, the principles of the described embodiments.

BRIEF DESCRIPTION OF THE DRAWINGS

Figure 1:
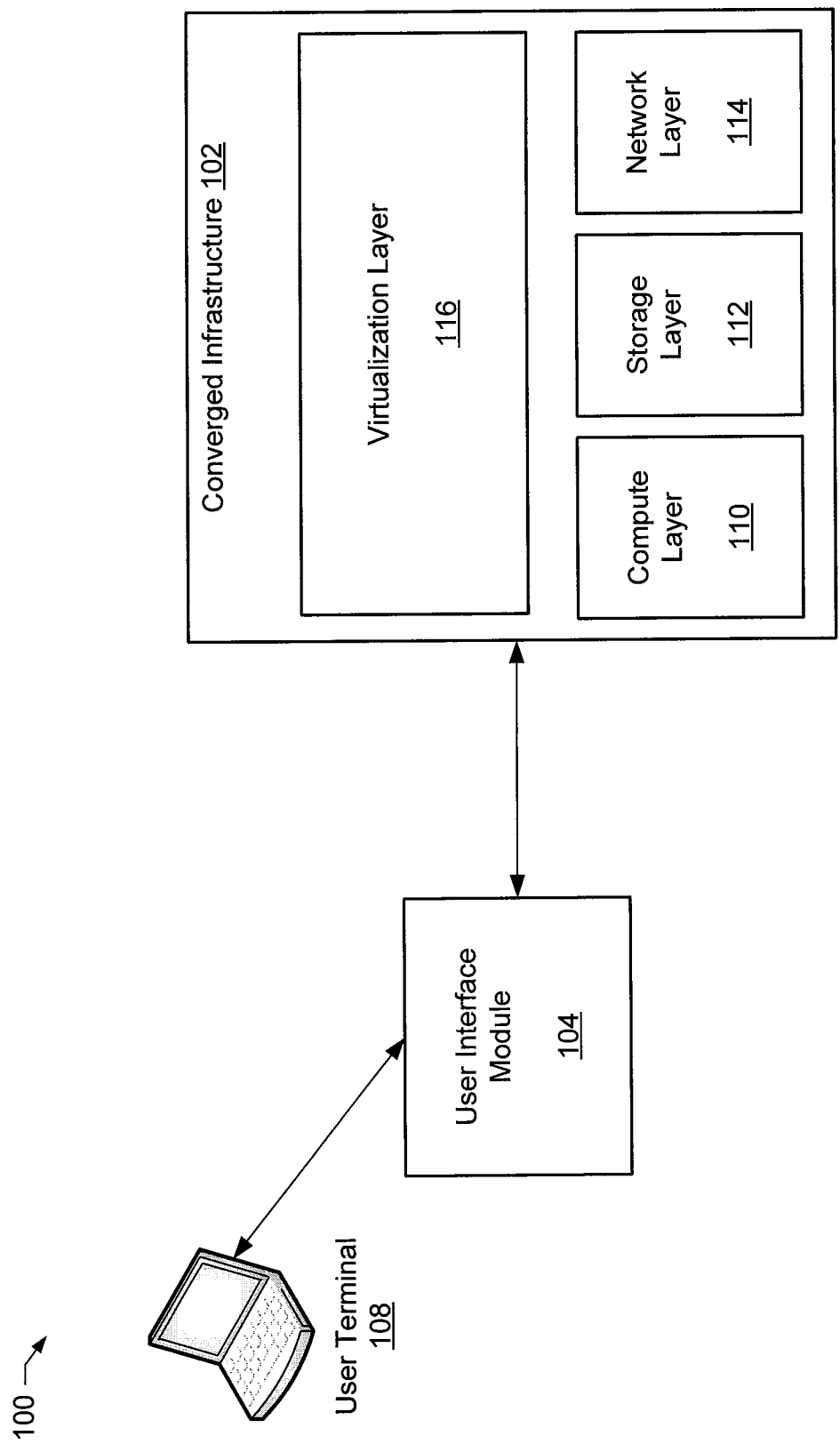
Figure 2:
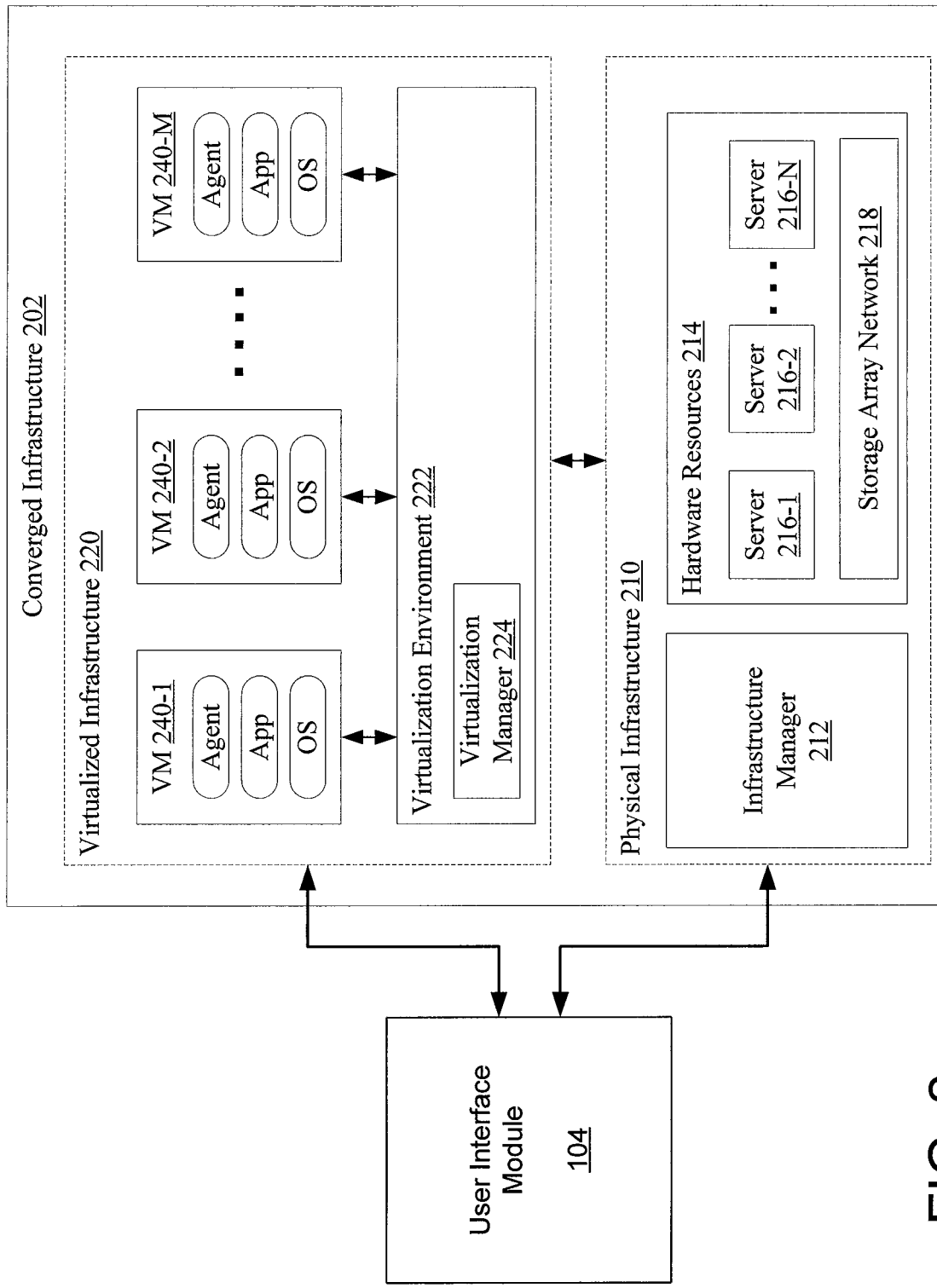
Figure 3:
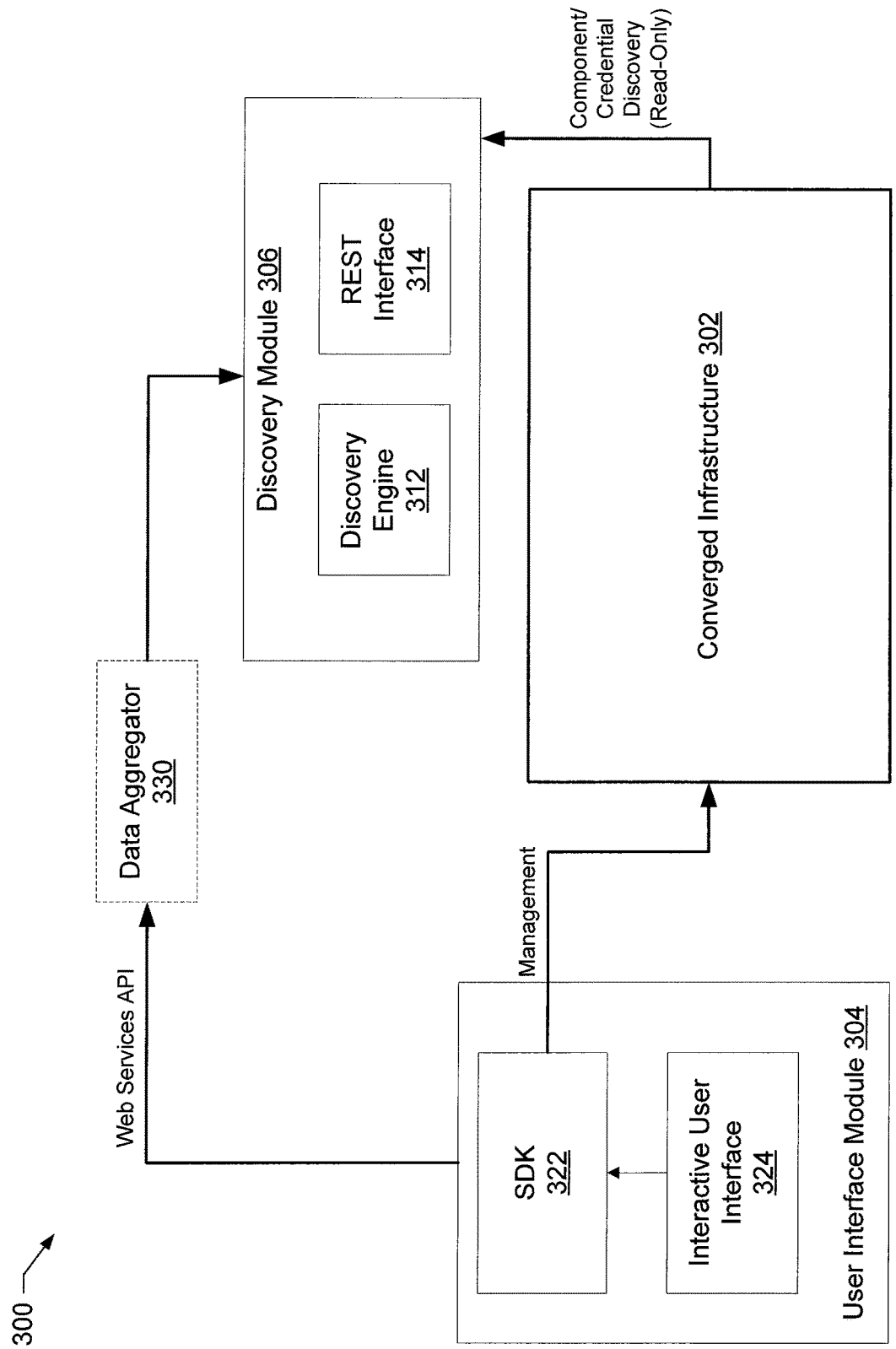
Figure 4:
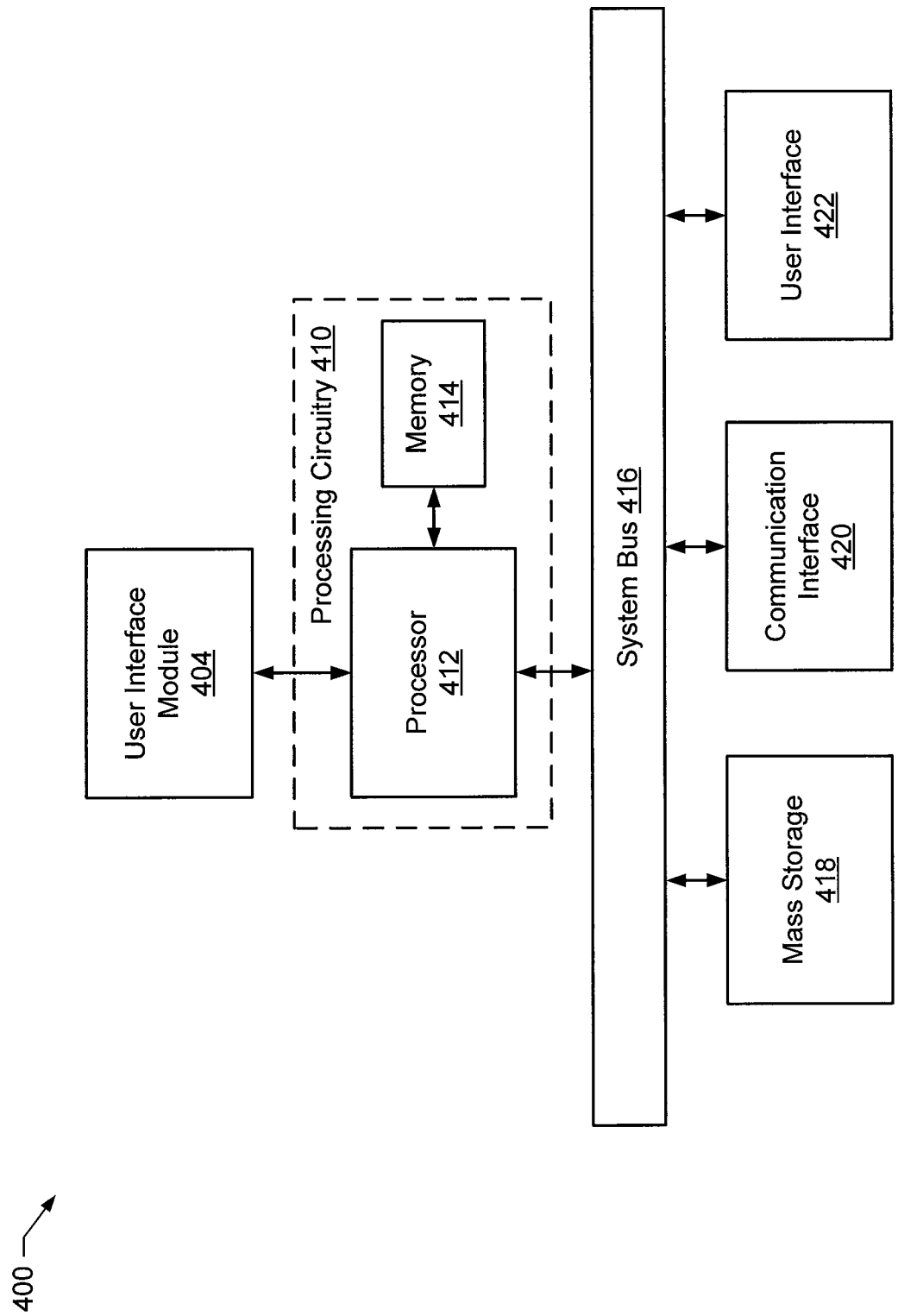
Figure 5:
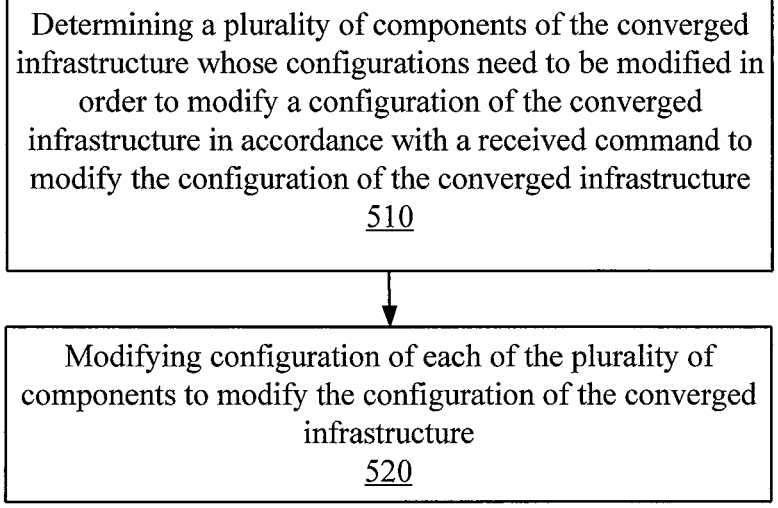

Having thus described the disclosure in general terms, reference will now be made to the accompanying drawings, which are not necessarily drawn to scale, and wherein:

FIG. 1 illustrates a system for enabling management of a converged infrastructure through a user interface in accordance with some example embodiments;

FIG. 2 illustrates a block diagram of an architecture of an example converged infrastructure in accordance with some example embodiments;

FIG. 3 illustrates a block diagram of another example system for enabling management of a converged infrastructure through a user interface in accordance with some example embodiments;

FIG. 4 illustrates a block diagram of an example computing system that may be used to implement some example embodiments;

FIG. 5 illustrates a flowchart according to an example method for enabling management of a converged infrastructure through a user interface in accordance with some example embodiments;

FIG. 6 illustrates an example command line session for modifying a configuration of a converged infrastructure as a single logical entity in accordance with some example embodiments;

FIG. 7 illustrates an example command line session for connecting to a component of a converged infrastructure via a user interface in accordance with some example embodiments;

FIG. 8 illustrates an example of providing a suggested command corresponding to user input in a command line session in accordance with some example embodiments; and FIG. 9 illustrates an example log of a command line session that may be maintained in accordance with some example embodiments.

DETAILED DESCRIPTION

The present disclosure now will be described more fully hereinafter with reference to the accompanying drawings, in which some, but not all aspects of the disclosure are shown. Indeed, the disclosure may be embodied in many different forms and should not be construed as limited to the aspects set forth herein; rather, these aspects are provided so that this disclosure will satisfy applicable legal requirements. Like numbers refer to like elements throughout.

As discussed above, converged infrastructures are presently managed in a piecemeal fashion on a component-by-component basis rather than in a converged manner as a single logical system. For example, in order to update the network time protocol (NTP) configuration on a converged infrastructure using present management techniques, a system administrator must iteratively access and update the NTP configuration on each of a plurality of components of the converged infrastructure, such as individual network switch, each storage array, each virtualization platform, and/or other components that may be implemented on a converged infrastructure. This piecemeal approach can be time consuming and error prone. For example, should a system administrator forget to update the NTP configuration on one or more components, the NTP configuration of the converged infrastructure may not be fully updated. Some example embodiments described herein below address this issue by providing a user interface enabling management of a converged infrastructure in a converged manner as a single logical entity rather than on a component-by-component basis. Furthermore, the user interface of some example embodiments may be configured to provide an abstracted command set such that a system administrator does not have to be familiar with multiple individual component interfaces and/or multiple command sets to manage a converged infrastructure.

FIG. 1 illustrates a system 100 for enabling management of a converged infrastructure through a user interface in accordance with some example embodiments. The system 100 may include a converged infrastructure 102, which may be embodied as any converged infrastructure. In this regard, the converged infrastructure 102 may include a plurality of components, such as servers, data storage devices, network equipment, and associated software, which may collectively form the converged infrastructure 102. By way of non-limiting example, in some embodiments, the converged infrastructure 102 may be implemented by a Vblock™ System available from the VCE Company, LLC of Richardson, Tex.

The converged infrastructure 102 of some embodiments may include one or more compute layer 110 components, such as one or more servers (e.g., blade servers, rack servers, and/or other servers), one or more fabric extenders, one or more fabric interconnects, a chassis, and/or other compute layer components that may be implemented on a converged infrastructure to provide computing and processing resources of the converged infrastructure. The converged infrastructure 102 may further include one or more storage layer 112 components, such as one or more storage arrays and/or other mass storage devices that may be implemented on a converged infrastructure. In some embodiments, the converged infrastructure 102 may additionally include one or more network layer 114 components, such as one or more switches and/or other network layer components that may be implemented on a converged infrastructure. For example, the network layer 114 may include components that provide switching and routing between the compute layer 110 and storage layer 112 within the converged infrastructure 102. The network layer 114 may additionally or alternatively include components that provide switching and routing between the converged infrastructure 102 and a network so as to support network communication between a component(s) of the converged infrastructure 102 and a computing platform(s) independent of the converged infrastructure 102. The components of the compute layer 110, storage layer 112, and network layer 114 may collectively provide a physical infrastructure of the converged infrastructure 102.

The converged infrastructure 102 may additionally include a virtualization layer 116, which may include one or more virtualization components configured to support one or more virtualized computing environments. The components of the virtualization layer 116 may include components embodied in software, hardware, firmware, and/or some combination thereof. For example, the virtualization layer 116 may include a hypervisor and/or other virtualization components that may be configured to create and run virtual machines and/or to otherwise virtually simulate a computing environment. In some example embodiments, the virtualization layer 116 may include and/or may be communicatively coupled with one or more management components configured to support management of the converged infrastructure 102. For example, in some embodiments, the virtualization layer 116 may include a management infrastructure, which may provide management resources for managing the converged infrastructure 102. In some such embodiments, the management infrastructure may be separate system from the converged infrastructure, but may be connected to the converged infrastructure to allow management of the entire converged infrastructure 102. In some example embodiments, the virtualization layer 116 may utilize physical hardware resources of the compute layer 110, storage layer 112, and/or network layer 114 to support operation of one or more components of the virtualization layer 116. Additionally or alternatively, in some example embodiments, the virtualization layer 116 may include dedicated physical resources (e.g., physical hardware components) that may provide computing, storage, and/or network communication resources to one or more components of the virtualization layer 116.

It will be appreciated that the compute layer 110, storage layer 112, network layer 114, and virtualization layer 116 as illustrated in FIG. 1 and described above are provided by way of example, and not by way of limitation. In this regard, in some embodiments, aspects of the compute layer 110, storage layer 112, network layer 114, and virtualization layer 116 as described above may not be mandatory and thus some may be omitted in certain embodiments. Additionally, the converged infrastructure 102 of some embodiments may include further or different layers and/or components beyond those illustrated in and described with respect to FIG. 1. A block diagram of an example converged infrastructure architecture that may be implemented by the converged infrastructure 102 of some example embodiments is illustrated in and described below with respect to FIG. 2.

Physical components of the converged infrastructure 102 may be communicatively coupled with each other to support operation of the converged infrastructure 102 via direct connection and/or network communication. For example, as discussed above, in some example embodiments, the network layer 114 may provide switching and routing between physical components of the converged infrastructure.

In some embodiments at least a portion of the components of the converged infrastructure 102 may be assigned addresses, such as Internet Protocol (IP) addresses and/or other network layer addresses, via which the components may be accessed by another component internal to the converged infrastructure 102 and/or via a computing device external to the converged infrastructure 102. For example, in some example embodiments, the converged infrastructure 102 and/or one or more network addressable components thereof may be accessed by an external computing device over a network to which the converged infrastructure 102 of some embodiments may be connected.

The system 100 may further include a user interface module 104, which may be configured to provide a user interface that may be configured to enable a user to manage the converged infrastructure 102 in accordance with one or more embodiments disclosed herein. In some embodiments, the user interface module 104 may be configured to provide a user interface that may be configured to enable a user to concurrently manage multiple converged infrastructures 102 via a single interface. Thus, while FIG. 1 illustrates a single converged infrastructure 102 by way of illustrative example, it will be appreciated that, in some embodiments, the system 100 may include a plurality of converged infrastructures 102 and the user interface module 104 may be interfaced with two or more of the plurality of converged infrastructures 102 to enable a user to manage multiple converged infrastructures 102 via a single interface. The user interface module 104 may be embodied as various means, such as circuitry, hardware, a computer program product including a computer readable medium storing computer readable program instructions (e.g., software, firmware, and/or the like) executable by a processing device, a specially programmed computer(s) or processor(s), or some combination thereof.

For example, in some embodiments, the user interface module 104 may be at least partially implemented by software that may be loaded on and executed by a computing device to configure the computing device to provide a user interface enabling management of the converged infrastructure 102 in accordance with one or more embodiments disclosed herein. As one particular example, in some embodiments, the user interface module 104 may be loaded on and/or executed by a computing platform of the converged infrastructure 102, such as a physical computing platform that may be included in the compute layer 110 and/or a virtual platform that may be provided by the virtualization layer 116.

As another particular example, in some embodiments, the user interface module 104 may comprise and/or be implemented on a computing device, such as the user terminal 108, which may be communicatively coupled to the converged infrastructure 102 such that the computing device may be configured by the user interface module 104 to provide a user interface enabling management of the converged infrastructure 102 in accordance with one or more embodiments disclosed herein. In this regard, in some embodiments, a computing device, such as the user terminal 108, which may be configured to implement functionality of the user interface module 104 may be communicatively coupled with the converged infrastructure 102 via one or more networks (e.g., one or more wireline networks, one or more wireless networks, a virtual private network (VPN), the Internet, or some combination thereof) or via a direct wireless or wireline link to the converged infrastructure 102.

In some example embodiments, the user interface module 104 may be embodied as and/or otherwise contained on a bootable computer readable storage medium storing computer readable program instructions (e.g., software), that may be loaded on and executed by a computing device, such as by way of non-limiting example, user terminal 108, to boot the computing device to a configuration configuring the computing device (e.g., a processor(s) of the computing device) to implement functionality of the user interface module 104 such that the computing device may be configured to provide a user interface enabling management of the converged infrastructure 102 in accordance with one or more example embodiments. For example, in some embodiments, the bootable computer readable storage medium may include a lightweight operating system (OS), such as a Linux kernel, to which a computing device may be booted, which may include an application and/or otherwise be configured to control the computing device to provide a user interface in accordance with one or more example embodiments. It will be appreciated that any computer readable storage medium that may be used to boot a computing device may be used in accordance with such example embodiments. For example, in some example embodiments, the user interface module 104 may be embodied as and/or otherwise contained on a flash memory device, such as a Universal Serial Bus (USB) flash drive, which may be inserted in a USB port and/or other port of a computing platform. As a further example, in some embodiments, the user interface module 104 may be embodied as and/or otherwise contained on a bootable optical disc, such as a bootable digital versatile disc (DVD), bootable compact disc read only memory (CD-ROM), bootable compact disc-recordable disc (CD-R), bootable compact disc-rewritable disc (CD-RW), bootable Blu-Ray disc, or the like, which can be inserted into an optical drive implemented on or otherwise operatively coupled with a computing device.

In some example embodiments in which the user interface module 104 is embodied as and/or otherwise contained on a bootable computer readable storage medium, the bootable computer readable storage medium may be used to boot a computing platform implemented on the converged infrastructure 102 to a configuration configuring the computing platform to implement functionality of the user interface module 104. For example, in some embodiments in which the user interface module 104 is embodied as and/or otherwise contained on a USB flash memory drive, the USB flash memory drive may be inserted into a USB port that may be implemented on the converged infrastructure 102 to boot a computing platform of the converged infrastructure 102 to a configuration configuring the computing platform to implement functionality of the user interface module 104. Similarly, in some embodiments in which the user interface module 104 is embodied as and/or otherwise contained on an optical disc, the optical disc may be inserted into an optical drive that may be operatively coupled with a computing platform of the converged infrastructure 102 to boot the computing platform to a configuration configuring the computing platform to implement functionality of the user interface module 104.

The user terminal 108 may be embodied as any computing device and/or physical user interface hardware for a computing platform that may be used by a user to interact with a user interface that may be provided by the user interface module 104 to facilitate management of the converged infrastructure 102 in accordance with one or more example embodiments. In this regard, the user terminal 108 may include various input/output devices to enable a user to interact with a user interface that may be provided by the user interface module 104. For example, the user terminal 108 may include a display for displaying the user interface. The user terminal 108 may further include one or more input mechanisms, such as a keyboard, touch screen display, microphone that may be configured to accept voice commands, biometric input, and/or other input mechanism that may be configured to enable a user to enter management commands via the user interface. By way of non-limiting example, the user terminal 108 may be embodied as a personal computer, such as a desktop computer, laptop computer or other personal computer; a mobile computing device, such as a tablet computer, smart phone, or other mobile computing device; an access terminal implemented on, connected to, and/or otherwise associated with the converged infrastructure 102, such as may be used to manage the converged infrastructure 102; and/or other suitably configured computing device or computing platform interface.

The user interface that may be provided by the user interface module 104 may be implemented via any of a variety of user interface form factors. For example, in some embodiments, the user interface module 104 may be configured to provide a command line interface (CLI), such as a shell, through which command line management commands may be entered by a user to manage the converged infrastructure 102. For example, in some embodiments, in which the user interface module 104 is configured to provide a CLI, the CLI may provide an interactive shell implemented using Python and/or a similar language, which may be configured to enable a user to enter a set of management commands for managing the converged infrastructure 102. The shell may be system agnostic and may be run on any operating system. Additionally or alternatively, in some embodiments, the user interface module 104 may be configured to provide a graphical user interface (GUI), which may provide a plurality of selectable management commands that may be selected by a user to manage the converged infrastructure 102.

Regardless of implementation, the user interface may provide a utility for actively exploring and modifying the converged infrastructure 102 in a converged manner through an administrative interface that removes the resident complexity that such management actions would otherwise require if managing individual components in a piecemeal fashion. In this regard, the user interface may be configured to enable a user to take direct action on one or more converged infrastructures 102 using a single command or single set of commands rather than forcing the user to individually perform management actions on multiple components. The user interface may combine disparate hardware software development kits (SDKs) into a common, integrated framework that allows users to programmatically define management solutions for the converged infrastructure 102.

In some example embodiments, the user interface may be configured to enable a user to seamlessly script against one or more instances of the converged infrastructure 102. Further, in some embodiments, the user interface may be configured to provide a user with in-context assistance. For example, the user interface may be configured to provide a user with access to help and guidelines (e.g., automatically) when needed. The help and guidelines may include available management commands, functionality of various management commands, and/or other assistance that may facilitate the user's usage of the user interface to manage the converged infrastructure 102.

In embodiments in which the user interface includes a shell or other CLI, the user interface may provide a framework enabling a user to logically build out a converged infrastructure system, update settings across multiple components (e.g., all components) of the converged infrastructure 102 (or multiple converged infrastructures), and/or perform other actions that a user may perform from a command line to operate on the converged infrastructure in a converged manner. In deployments in which multiple converged infrastructures 102 may be deployed within a management environment, the CLI of some embodiments may be configured to enable management of multiple converged infrastructures 102, and thus may remove much of the difficulty of multi-system remediation, providing administrators with a single tool to accomplish their most difficult challenges of managing converged infrastructures.

The CLI of some embodiments may take a large amount of complexity out of managing a converged infrastructure, such as converged infrastructure 102, from a command line interface. Rather than needing to learn a command set for each component, the CLI of such embodiments may abstract the command set, and can provide in-context help and command-line completion (e.g., tab-completion) in which the CLI may be configured to suggest commands matching partially typed commands to guide the user to the command for which he or she is looking. Further, in some embodiments, the CLI may provide inline help that may be indicative of the functionality of various commands, provide tutorials for how to use various commands, and/or that may otherwise help a user to use the CLI to manage the converged infrastructure 102. In this regard, the CLI may be interactive with the user to facilitate user management of the converged infrastructure 102.

In some embodiments providing a CLI, the abstracted command set may include abstracted management commands for managing the converged infrastructure 102 as a single logical entity. For example, rather than forcing the user to update an NTP configuration on each individual component of a converged infrastructure, an abstracted command to update the NTP configuration of the converged infrastructure 102 may be abstracted to:

for convergedInfrastructrure in client.get_convergedInfrastructures( ):
        convergedInfrastructure.configure_ntp("10.X.X.X")

In this regard, the user interface module 104 may be configured to perform a set of NTP configuration updates by sending appropriate commands to each component of the converged infrastructure 102 for which an NTP configuration update needs to be performed in order to update the NTP configuration of the converged infrastructure 102. However, from the user perspective, the abstracted command may enable the user to update the NTP configuration of the converged infrastructure 102 as a single logical entity via a single command rather than individually addressing each individual component on which an NTP configuration update needs to be performed.

Additionally or alternatively, in some embodiments providing a CLI, the abstracted command set may include abstracted commands that may reduce the complexity of managing individual components. As an example, rather than using a variety of disparate commands to access and configure various components (e.g., SSH commands to access a switch; an XML API to access and configure a compute layer 110 component; a vSphere API to access and configure a virtualization layer 116 component; and so on), a command to access a component may be abstracted to <component>.connect( ). In this regard, the user interface module 104 may be configured to identify the actual component(s) corresponding to the abstracted command, translate the abstracted command to a command understood by the component(s) and perform a management action on the component. Accordingly, the actual disparate commands that may be natively recognized by the components of the converged infrastructure 102 may be abstracted from the user perspective such that the user may use a single abstracted command set to manage the converged infrastructure 102. Moreover, from the user perspective, the connect( ) method may contain help and usage information that may span devices, thus further improving the user friendliness of the CLI of such embodiments in a converged environment.

In some embodiments implementing a CLI, information may be returned as objects. The return of information as objects may provide a powerful, customizable interface, which may provide a user with full control and management of the converged infrastructure 102, including remediation control, where appropriate. A user may choose to write scripts against the CLI and/or use the CLI in an interactive mode.

Regardless of implementation of the user interface (e.g., whether implemented as a GUI, CLI, or some combination thereof) that may be provided by the user interface module 104, user interface may enable user to enter any of a variety of management commands for managing one or more converged infrastructures 102 in a converged manner (e.g., as a single logical system). For example, the user interface may enable a user to perform system remediation functions, such as ad-hoc active management. In some embodiments, the user interface may be configured to enable a user to perform scripted remediation in which most, if not all tasks for configuring components of converged infrastructure 102 to comply with a set of configuration guidelines may be automated. Further, in some embodiments, the user interface may enable a user to perform scripted remediation in accordance with hardening guidelines to harden one or more converged infrastructures 102 against potential security vulnerabilities. In some example embodiments, the user interface may be configured to enable a user to perform scripted remediation in accordance with compliance guidelines, such as the Health Insurance Portability and Accountability Act (HIPAA), Payment Card Industry (PCI) Security Standards, Sarbanes-Oxley (SOX) Act guidelines, and/or other compliance guidelines.

Further, the user interface that may be provided by the user interface module 104 in accordance with some embodiments may enable a user to interactively explore one or more converged infrastructures 102. This interactive exploration may allow for the performance of one-time queries that may be used in troubleshooting. Further, the user interface may allow for integration with existing extensions and libraries such that the user interface may serve as an integration point for a variety of management and orchestration tools that may be associated with a converged infrastructure 102.

As a more particular example, the user interface of some embodiments may enable a user to perform a variety of system configuration functions on the converged infrastructure 102. In this regard, the user interface may enable a user to enter a variety of commands (e.g., converged commands) for modifying a configuration of a converged infrastructure 102 as a single logical entity. In response to receipt of a command to modify the configuration of the converged infrastructure 102, the user interface module 104 may be configured to determine a set of components whose configurations need to be updated (e.g., based on knowledge by the user interface module 104 of the components included in the converged infrastructure 102) in order to implement the configuration update. For example, in some embodiments, the user interface module 104 may be configured to store a set of pre-defined mappings between converged commands and respective sets of components implicated by the commands. The user interface module 104 may, in turn, be configured to perform a set of configuration updates on the determined components by sending appropriate commands to each component for which a configuration update needs to be performed to update the configuration of the converged infrastructure 102 in accordance with the received command. However, from the user perspective, a converged command entered by the user may be an abstracted command by which the user may update the configuration of the converged infrastructure 102 as a single logical entity rather than individually addressing each individual component on which a configuration update may be performed to implement the configuration update to the converged infrastructure 102.

It will be appreciated that the user interface module 104 may be configured to provide a user interface enabling a user to enter any of a variety of converged commands for updating a configuration of the converged infrastructure 102 as a single logical entity. By way of non-limiting example, in various embodiments, converged commands may be used to update NTP configuration of the converged infrastructure 102, a Syslog configuration for logging messages in the converged infrastructure 102, a system network management protocol (SMNP) configuration of the converged infrastructure 102, various authentication, authorization, and accounting (AAA) configurations of the converged infrastructure 102, and/or other configurations for which the configuration of multiple components may need to be updated in order to update the configuration of the converged infrastructure 102.

As further examples of various system remediation and management tasks that may be performed via a user interface in accordance with various embodiments, the user interface of some example embodiments may be configured to enable a user to start workflows on the converged infrastructure 102, install/remove software on the converged infrastructure 102, and/or manage user access credentials for the converged infrastructure 102 and/or for various components thereof.

The user interface of some embodiments may be configured to enable a user to perform maintenance tasks on a converged infrastructure 102 and/or multiple converged infrastructures 102 form a single interface. For example, the user interface of some embodiments may enable a user to perform log collection tasks, certificate upgrades, and/or other maintenance tasks on one or more converged infrastructures 102. In accordance with some such embodiments, the management tasks may be performed via commands abstracting the converged infrastructure (or infrastructures) 102 as single logical entity.

In some example embodiments, the user interface module 104 may be configured to provide a user interface enabling a user to perform system hardening tasks on one or more converged infrastructures 102. For example, the user interface may be configured to enable a user to remediate lower level settings on components of the converged infrastructure 102, such as by disabling unused services, setting banner configurations, and/or other hardening tasks.

In some example embodiments, the user interface module 104 may be configured to provide for credential-less management of the converged infrastructure 102. In this regard, in some embodiments, access credentials for the converged infrastructure 102 and/or various components thereof may be pre-stored such that when a user enters a command for managing the converged infrastructure 102, the user interface module 104 may be configured to determine the pre-stored access credential(s) associated with components that need to be accessed in order to implement the user's command and may use the pre-stored access credentials to manage components without requiring the user to enter the access credentials. Accordingly, in such embodiments, the user (e.g., an authenticated and authorized user) does not need to remember access credentials for each component, but rather can specify actions on the converged infrastructure 102 and/or components thereof and the user interface module 104 may supply the appropriate pre-stored access credentials that may be needed to access and manage components implicated by a user command.

In some embodiments, the access credentials may be securely stored such that they may not be accessed or modified by a user lacking requisite permissions. Further, in some example embodiments, each remediation and/or other management action that may be performed via a user interface in accordance with various embodiments may be subject to AAA conditions such that a management command may not be performed by a user lacking appropriate authorization and/or that a pre-stored access credential may not be used to perform a management command entered by a user lacking authorization to use the access credential. For example, in some embodiments, a user may log into the user interface and may be granted permission to perform management actions and/or use a subset of pre-stored access credentials falling within a scope of AAA permissions that may be granted to the user.

In some embodiments, such as that illustrated in and described below with respect to FIG. 3, a discovery module, such as may be provided by a version of VCE Vision™ Intelligent Operations available from the VCE Company, LLC of Richardson, Tex., may be configured to implement a discovery process to discover the components of the converged infrastructure 102 and gather the appropriate access credentials that may be needed to access discovered components. The discovered components and associated access credentials that may be gathered from the discovery process may be stored and used by the user interface module 104 to provide user interface functionalities in accordance with various example embodiments.

In some example embodiments, the components of the converged infrastructure 102 may be mapped to a hierarchical tree. In order to execute a command to modify a configuration and/or otherwise manage the converged infrastructure 102 or component thereof that may be received via the user interface, the management action may need to be performed by the user interface module 104 within a specific point or points of the hierarchical tree. The user interface module 104 may accordingly be configured to determine an appropriate launch point(s) within the hierarchical tree for performing a management operation to implement a received command and may execute the operation at the determined launch point(s).

Further, in some embodiments in which the user interface module 104 may be configured to provide automated launch-point-dependent variable initialization. For example, in some embodiments in which the user interface module 104 is configured to provide a CLI, a user may be enabled to launch the CLI at a particular point of the hierarchical tree. Rather than statically initializing commands without regard to the launch point, the user interface module 104 may be configured to dynamically understand the launch point within the tree and initialize the appropriate parent objects based on the launch point. The user may accordingly be provided access to commonly used functions and objects at the given launch point. Further, in some embodiments in which the user interface module 104 is configured to provide a GUI, a user may be able to graphically navigate the hierarchical tree. A set of selectable commands which the user may be able to access and select via the GUI may be selected and presented by the user interface module 104 based on a point within the hierarchical tree to which the user has navigated.

In some example embodiments, the user interface module 104 may provide an integrated logging functionality in which management actions that may be taken by a user via the user interface of various embodiments may be logged for audit and/or reuse. For example, in embodiments implementing a CLI, a command line session may be logged and stored for later auditing and/or reuse. As another example, in embodiments implementing a GUI, commands selected and/or otherwise entered via the GUI during a given session may be logged and stored.

FIG. 2 illustrates a block diagram of an architecture of an example converged infrastructure 202 in accordance with some example embodiments. The converged infrastructure 202 may, for example, be an embodiment of the converged infrastructure 102 in accordance with some example embodiments. It will be appreciated that the components and associated architecture illustrated in and described with respect to FIG. 2 are provided by way of example, and not by way of limitation. In this regard, components illustrated in FIG. 2 and described further below may not be mandatory and thus some may be omitted in certain embodiments. Additionally, some embodiments may include further or different components, beyond those illustrated in and described with respect to FIG. 2. Further, it will be appreciated that converged infrastructures within the scope of the disclosure may implement architectures other than that illustrated in and described with respect to FIG. 2.

The converged infrastructure 202 may include a physical infrastructure 210 configured to support a virtualized infrastructure 220. In some example embodiments, the physical infrastructure 210 may include hardware resources 214, such as servers 216-1 to 216-N (sometimes referred to as "hosts") and one or more storage array networks (SAN), such as SAN 218, which may be communicatively connected by a network (not shown). The physical infrastructure 210, including hardware resources 214 may, for example, provide an embodiment of the compute layer 110, storage layer 112, and network layer 114. For example, the servers 216 may comprise an implementation of the compute layer 110, and the SAN 218 may comprise an implementation of the storage layer 112. The hardware resources 214, including, for example, the servers 216 and SAN 218 may be communicatively connected by an embodiment of the network layer 114.

In some example embodiments, the physical infrastructure 210 may be organized into a "computing-block" based infrastructure, wherein physical infrastructure units may be characterized by repeatable units of construction having similar performance, operational characteristics, and discrete requirements of power, space, and cooling that facilitate rapid deployment, integration, and scalability. The computing-block based infrastructure may be configured to dynamically provision hardware resources based on performance demands placed on the physical infrastructure 210. One such example of physical infrastructure 210 is a Vblock System available from the VCE Company, LLC.

The physical infrastructure 210 may further include an infrastructure manager 212 configured to manage the configuration, provisioning, and policy compliance of the physical infrastructure 210. Infrastructure manager 212 may be configured to provide an interface by which provisioning of hardware resources 214 (e.g., computing, networking, storage) may be managed with policy-based automation. According to some embodiments, the infrastructure manager 212 may be included in every physical infrastructure 210 to manage the configuration, provisioning, and compliance of computing-block based infrastructure. As described in further detail below, the virtualized infrastructure 220 (or component thereof) of some example embodiments may be configured to connect to and communicate with the infrastructure manager 212 to manage and/or configure the physical infrastructure 210 to support operation of components of the virtualized infrastructure 220. One example of an infrastructure manager 212 includes EMC Ionix Unified Infrastructure Manager (UIM) available from EMC Corporation. In some embodiments, the infrastructure manager 212 may further be configured to provide network manager functionality such that the infrastructure manager 212 may be configured to configure network devices (e.g., switches, routers) and manage addressing, subnets, virtual local area networks (VLANs), and/or other network configurations that may be implemented on the converged infrastructure 202. One example of a network manager that may be included on the infrastructure manager 212 of such embodiments is a Cisco Switch, such as may be accessible via a Cisco IOS® command line interface (CLI), available from Cisco System, Inc.

The virtualized infrastructure 220 may include a virtualization environment 222 comprising one or more virtual machines (VM) 240, such as VM 240-1 to VM 240-M. Each virtual machine 340 can have an operating system (OS), one or more applications (APP) and an agent (AGENT). In some embodiments, one or more of the virtual machines 340 may be configured to connect to one or more users by a communications network, such as the Internet. The virtualized infrastructure 220 may, for example, comprise an embodiment of at least a portion of the virtualization layer 116.

The virtualization environment 222 may accordingly be configured to simulate (e.g., to virtualize) conventional components of a computing device, such as a processor, system memory, a hard disk drive, and/or the like for executing the VMs 240. For example, each VM 240 may include a virtual processor and a virtual system memory configured to execute an application. Thus, for example, the converged infrastructure 202 of some example embodiments may be configured to perform physical-to-virtual conversion of hardware resources 214 and/or other physical computing of the physical infrastructure 210 to support or host virtual machines 240 in the virtualized infrastructure 220. In this regard, components of the physical infrastructure 210 may include physical components, such as physical servers and/or other computing devices, memories, buses, networks, and/or other physical components, which may collectively support the virtualized infrastructure 220 and VMs 240.

A virtualization manager 224 of the virtualization environment 222 may be configured to establish and oversee the VMs 240. The virtualization manager 224 may be configured to dynamically allocate resources among the virtual machines 240. For example, in some embodiments, the virtualization manger 224 may be configured to communicate with the infrastructure manager 212 to manage and/or configure the physical infrastructure 210 to support operation of the virtual machines 240. The virtualization manager 224 of some example embodiments may be implemented with the VMware® vCenter® virtualized management platform available from VMware, Inc., of Palo Alto, Calif.

In some example embodiments, virtualization environment 222 may be implemented by running VMware vSphere® and/or VMware ESX®-based hypervisor technologies, available from Vmware, Inc., on servers 216. However, it will be appreciated that any virtualization/hypervisor technology may be used in addition to or in lieu of Vmware hypervisor technologies in accordance with various example embodiments.

As further illustrated in FIG. 2, the user interface module 104 of some example embodiments may be configured to interface with the converged infrastructure 202. In this regard, the user interface module 104 may be configured to provide a user interface enabling management of one or more converged infrastructures 202 and/or components thereof. Thus, for example, the user interface module 104 may be configured to provide a user interface configured to enable a user to manage the converged infrastructure 202 as a single logical system. Additionally or alternatively, the user interface module 104 of some embodiments may be configured to provide a user interface configured to enable a user to manage components included in the physical infrastructure 210 and/or virtualized infrastructure 220 through an abstracted command set.

FIG. 3 illustrates a block diagram of an example system 300 for enabling management of a converged infrastructure through a user interface in accordance with some example embodiments. The system 300 may include a converged infrastructure 302, which may, for example, comprise an embodiment of the converged infrastructure 102 and/or converged infrastructure 202. The system 300 may further include a user interface module 304, which may, for example, comprise an embodiment of the user interface module 104. The user interface module 304 may be interfaced with the converged infrastructure 302 such that the user interface module 304 may provide management commands to the converged infrastructure 302 based on commands that may be entered by a user via an interactive user interface 324 provided by the user interface module 304. The interactive user interface 324 may, for example, provide a CLI and/or GUI enabling a user to manage the converged infrastructure 302 in accordance with various example embodiments.

The system 300 may additionally include a discovery module 306, which may be configured to perform a discovery process to discover components of the converged infrastructure 302 and gather the appropriate access credentials that may be needed to access discovered components. For example, in some embodiments, the discovery module 306 may be at least partially implemented by VCE Vision. The discovery module 306 may include a discovery engine 312, which may be configured to facilitate the discovery process by discovering physical and/or logical components implemented on the converged infrastructure 302. The discovery engine 312 may be further configured to collect metrics about discovered components, such as by way of non-limiting example, the capacity of a discovered storage array, the temperature of a discovered physical component, the fan speed of a discovered physical component, identities of users using and/or allowed to use a component, and/or other metrics. The discovery process that may be performed by the discovery module 306 may be a read-only process.

The user interface module 304 may, in turn, be interfaced with the discovery module 306 such that he user interface module 304 can query the discovery module 306 for information on the components of the converged infrastructure 302 and associated access credentials and/or can otherwise access information on the components of the converged infrastructure 302 and associated access credentials that may be gathered by the discovery module 306. For example, in some embodiments, the discovery module 306 may include an API, such as representational state transfer (REST) interface 314, which may be configured to handle requests from the user interface module 304. In this regard, the REST interface 314 of some example embodiments may include a set of RESTful API methods for enabling the user interface module 304 to obtain and/or otherwise access information about discovered components, discovered component metrics, and/or other information that may be discovered by the discovery module 306 in a structured format.

The user interface module 304 may be configured to use knowledge of the components of the converged infrastructure 302 and associated access credentials that may be obtained from the discovery module 306 to provide functionality of the interactive user interface 324. For example, based on knowledge of the components of the converged infrastructure 302, the user interface module 304 may be configured to determine the components for which management action may need to be taken in order to implement a command provided by the user, via the interactive user interface 324, to manage the converged infrastructure 302. Additionally or alternatively, access credentials that may be obtained from the discovery infrastructure 302 may be used to provide credential-less management of the converged infrastructure 302 such that an authorized user does not have to enter access credentials for components of the converged infrastructure 302 when using the interactive user interface 324.

In some example embodiments, the user interface module 304 may include SDK 322, which may combine disparate component SDKs for various components of the converged infrastructure 302. In this regard SDK 322 may be configured to interface with respective component SDKs for components of the converged infrastructure 302 such that abstracted commands received via the interactive UI 324 may be translated by the interactive UI 324 and/or SDK 322 into commands understandable by respective components of the converged infrastructure 302. Thus, for example, if the user enters a command to modify a configuration of the converged infrastructure 302 as a single logical entity via the interactive UI 324, the SDK 322 may facilitate interfacing with and management of respective components of the converged infrastructure 302 such that components whose configurations need to be modified in order to modify the configuration of the converged infrastructure 302 in accordance with the received command may be modified. In some example embodiments, the SDK 322 may provide functions corresponding to RESTful methods that may be provided by the REST interface 314 to enable the user interface module 304 to to obtain and/or otherwise access information about discovered components, discovered component metrics, and/or other information that may be discovered by the discovery module 306.

In some implementations, the system 300 may further include a data aggregator 330. The data aggregator 330 may be implemented in embodiments in which the user interface module 304 may be interfaced with multiple converged infrastructures 302 to enable management of multiple converged infrastructures 302 (e.g., concurrently) via a single interface. In this regard, the data aggregator 330 may be configured to collect data from and/or convey commands to multiple instances of converged infrastructures 302 to facilitate management of multiple converged infrastructures 302 from a single interface. Thus, while FIG. 3 illustrates a single converged infrastructure 302 by way of illustrative example, it will be appreciated that, in some embodiments, the system 200 may include a plurality of converged infrastructures 202 and the data aggregator 330 may be configured to serve as a hub interfacing the user interface module 304 with each of the plurality of converged infrastructures 302 to enable a user to manage multiple converged infrastructures 202 via a single interface. The data aggregator 330 may further provide load balancing functionality in such embodiments.

It will be appreciated that aspects of the data aggregator 330 may be omitted in some embodiments. For example, in some embodiments in which the user interface module 304 is only interfaced with a single converged infrastructure 302, the data aggregator 330 may be omitted entirely.

FIG. 4 illustrates a block diagram of an example computing system 400 that may be used to implement some example embodiments. The computing system 400 may be implemented on any computing device or plurality of computing devices that may be configured to implement one or more example embodiments. By way of non-limiting example, in some embodiments, the computing system 400 may be implemented on the user terminal 108 and/or a computing platform(s) of the converged infrastructure 102.

The computing system may include a plurality of elements, such as user interface module 404, processing circuitry 410, mass storage 418, communication interface 420, and user interface 422, which may be interfaced via a system bus 416. It will be appreciated that the components, devices or elements illustrated in and described with respect to FIG. 4 below may not be mandatory and thus some may be omitted in certain embodiments. Additionally, the computing system 400 of some embodiments may include further or different components, devices or elements beyond those illustrated in and described with respect to FIG. 4.

Further, while FIG. 4 illustrates an architecture including elements interfaced via the system bus 416, it will be appreciated that in some example embodiments, elements of the computing system 400 may be implemented in a distributed computing environment in which elements may be distributed across a plurality of computing devices, which may be in communication with each other, such as via a network, to provide functionality of the computing system 400. As such, in some example embodiments, elements of the computing system 400 may be communicatively coupled via a network in addition to or in lieu of the system bus 416.

The computing system 400 of some example embodiments may implement an operating system(s), such as MS-WINDOWS™, UNIX™, LINUX™, IBM z/OS™, CISCO™ INTERNETWORK OPERATING SYSTEM™ (IOS), CISCO™ CATALYST™ OPERATING SYSTEM (CatOS), CISCO NX-OS, EMC™ ISILON OneFS™ OPERATING SYSTEM, NETAPP™ DATA ONTAP™, or other known operating systems. It should be appreciated, however, that in some embodiments, one or more aspects of the computing system 400 may be implemented on and/or integrated with a virtualized computing system, such as may be provided by a converged infrastructure (e.g., the converged infrastructure 102, converged infrastructure 202, and/or converged infrastructure 302).

In some example embodiments, the computing system 400 may include processing circuitry 410 that is configurable to perform actions in accordance with one or more example embodiments disclosed herein. In this regard, the processing circuitry 410 may be configured to perform and/or control performance of one or more functionalities for determining a configuration of a converged infrastructure, such as converged infrastructure 102 and/or converged infrastructure 202, in accordance with various example embodiments. Thus, the processing circuitry 410 may be configured to perform data processing, application execution and/or other processing and management services according to one or more example embodiments.

In some example embodiments, the processing circuitry 410 may include a processor 412 and, in some embodiments, such as that illustrated in FIG. 4, may further include memory 414. The processing circuitry 410 may be in communication with (e.g., via system bus 416) and/or otherwise control the user interface module 404, mass storage 418, communication interface 420, and/or user interface 422.

The processor 412 may be embodied in a variety of forms. For example, the processor 412 may be embodied as various hardware processing means such as a microprocessor, a coprocessor, a general purpose processor, a controller or various other computing or processing devices including integrated circuits (e.g., a logic device), such as an ASIC (application specific integrated circuit), an FPGA (field programmable gate array), some combination thereof, or the like. Although illustrated as a single processor, it will be appreciated that the processor 412 may comprise a plurality of processors. The plurality of processors may be in operative communication with each other and may be collectively configured to perform one or more functionalities to support determination of a configuration of a converged infrastructure in accordance with various embodiments. In some embodiments in which the computing system 400 is embodied as a plurality of computing devices, a plurality of processors, which may collectively form the processor 412, may be distributed across a plurality of computing devices that may be in operative communication with each other directly and/or via a network. In some example embodiments, the processor 412 may be configured to execute instructions that may be stored in a memory, such as the memory 414 and/or the mass storage 418 and/or that may be otherwise accessible to the processor 412. As such, whether configured by hardware or by a combination of hardware and software, the processor 412 may be capable of performing operations according to various embodiments while configured accordingly.

In embodiments including the memory 414, the memory 414 may include read only memory (ROM), random access memory (RAM), and/or the like. The mass storage 418 may include one or more memory and/or other storage devices, which may include fixed (e.g., a fixed hard disc drive, storage array, fixed flash memory device, and/or the like) and/or removable memory devices (e.g., a floppy disc drive, a removable flash memory device, an optical disc drive, and/or other removable memory device). The mass storage 418 may provide a persistent data storage device. In some example embodiments, the mass storage 418 may be configured to provide a backup storage. The mass storage 418 may include a memory device implemented locally to the computing system 400 and/or a memory device remote to the computing system 400, which may be communicatively coupled with the computing system 400, such as via a network. In some embodiments in which the computing system 400 is embodied as a plurality of computing devices, the memory 414 and/or mass storage 418 may include a plurality of memory devices, which may be distributed across a plurality of computing devices that may be in operative communication with each other directly and/or via a network to form the computing system 400.

In some embodiments, the memory 414 and/or the mass storage 418 may provide a non-transitory computer-readable storage medium that may store computer program instructions that may be executed by the processor 412. In this regard, the memory 414 and/or mass storage 418 may be configured to store information, data, applications, instructions and/or the like for enabling the computing system 400 to carry out various functions in accordance with one or more example embodiments. Applications that may be executed by the processor 412 may also be in the form of modulated electronic signals that may be accessed via a network modem or other network interface of the computing system 400.

The computing system 400 may further include a communication interface 420. The communication interface 420 may enable the computing system 400 to communicate (e.g., over a network or other communication interface) with another computing device or system, such as the converged infrastructure 102, user terminal 108, and/or other computing device or system. In this regard, the communication interface 420 may include one or more interface mechanisms for enabling communication with other devices and/or networks. As such, the communication interface 420 may include, for example, an antenna (or multiple antennas) and supporting hardware and/or software for enabling communications with a wireless communication network (e.g., a cellular network, wireless local area network, and/or the like) and/or a communication modem or other hardware/software for supporting communication via cable, digital subscriber line (DSL), USB, FireWire, Ethernet, one or more optical transmission technologies, and/or other wireline networking methods.

In some example embodiments, the computing system 400 may include the user interface 422. It will be appreciated, however, that in some example embodiments, one or more aspects of the user interface 422 may be omitted, and in some embodiments, the user interface 422 may be omitted entirely. The user interface 422 may be in communication with the processing circuitry 410 to receive an indication of a user input and/or to provide an audible, visual, mechanical, or other output to a user. As such, the user interface 422 may include, for example, a keyboard, a mouse, a joystick, a display, a touch screen display, a microphone, a speaker, one or more biometric input devices, and/or other input/output mechanisms.

In embodiments including a user interface 422, the user interface 422 may be configured to enable a user to interact with a user interface, such as a CLI and/or GUI, that may be provided by the user interface module 104, user interface module 304, and/or user interface module 404, in order to manage a converged infrastructure, such as converged infrastructure 102, converged infrastructure 202, and/or converged infrastructure 302. For example, a display, touch screen display, and/or other output device of the user interface 422 may be configured to provide for display of a user interface that may be provided by the user interface module 104, user interface module 304, and/or user interface module 404. As a further example, an input mechanism, such as a keyboard, touch screen display, microphone, biometric input device, and/or other input mechanism may enable a user to enter commands via a user interface that may be provided by the user interface module 104, user interface module 304, and/or user interface module 404. In some example embodiments one or more aspects of the user interface 422 may be implemented on and/or otherwise provided by the user terminal 108. In this regard, the user interface that may be provided by the user interface module 104, user interface module 304, and/or user interface module 404 may be a visual user interface with which a user may interact to manage a converged infrastructure, while the user interface 422 may provide the physical input/output mechanisms for enabling a user to view and interact with the user interface.

The computing system 400 may further include user interface module 404. The user interface module 404 may be an embodiment of the user interface module 104 and/or user interface module 304. The user interface module 404 may be embodied as various means, such as circuitry, hardware, a computer program product comprising computer readable program instructions stored on a computer readable medium (for example, the memory 414 and/or mass storage 418) and executed by a processing device (for example, the processor 412), or some combination thereof. In some embodiments, the processor 412 (or the processing circuitry 410) may include, or otherwise control the user interface module 404. For example, in some embodiments, the processor 412 may be configured to perform functionality of the user interface module 404 (e.g., functionality of the user interface module 104 and/or user interface module 304) through execution of instructions that may be stored on and/or otherwise loaded onto the memory 414 and/or the mass storage 418. In some such embodiments, the user interface module 404 may be loaded on a computing platform of the computing system 400 and/or a computing platform of the computing system 400 may be booted to the user interface module 404 to configure the processor 412 to perform functionality of the user interface module 404.

FIG. 5 illustrates a flowchart according to an example method for enabling management of a converged infrastructure, such as converged infrastructure 102, converged infrastructure 202, and/or converged infrastructure 302, through a user interface in accordance with some example embodiments. In this regard, FIG. 5 illustrates operations that may be performed by the user interface module 104 and/or user interface module 304 in accordance with some example embodiments. One or more elements of the computing system 400, such as the user interface module 404, processing circuitry 410, processor 412, memory 414, system bus 416, mass storage 418, communication interface 420, and/or the user interface 422 may, for example, provide means for performing one or more of the operations illustrated in and described with respect to FIG. 5 in accordance with some example embodiments.

Operation 510 may include determining a plurality of components of the converged infrastructure whose configurations need to be modified in order to modify the configuration of a converged infrastructure in accordance with a received command to modify the configuration of the converged infrastructure. For example, in some embodiments, there may be a mapping between commands that may be entered via the user interface and known components of the converged infrastructure that may be implicated by respective commands. As a further example, in instances in which the received command references a component by type to collectively modify a configuration of all components of that type implemented on the converged infrastructure, operation 510 may include determining a plurality of components of the referenced type that are implemented on the converged infrastructure.

The received command may be a command entered via a user interface. For example, in some embodiments, an indication of a command entered via the user interface may be received and operation 510 may be performed in response to receipt of the indication. The user interface may be configured to enable a user to manage the converged infrastructure. For example, the user interface may be configured to enable a user to manage the converged infrastructure through a set of abstracted commands enabling management of the converged infrastructure as a single logical entity. In some embodiments, the user interface may include a CLI through which a user may enter commands for managing the converged infrastructure. Thus, for example, in embodiments in which the user interface includes a CLI, the received command may be a command entered via the CLI. Additionally or alternatively, in some embodiments, the user interface may include a GUI, which may include a plurality of selectable commands for managing the converged infrastructure. In embodiments in which the user interface includes a GUI, the received command may, for example, be a command option selected via the GUI.

The received command may, for example, be an abstracted command referencing the converged infrastructure as a single logical entity without referencing any particular component of the converged infrastructure. In this regard, the command may be a converged command to perform an operation on a converged infrastructure as a converged system such that the actual component level operations that may be performed to implement the command may be abstracted from the user.

As another example, the received command may be an abstracted command referencing a type of component, but not specifically addressing a component(s) of the referenced type. In this regard, the logical address of a specific component(s), the native command set for interacting with the component, access credentials for accessing the component, and/or the like may be abstracted to the user such that the user may perform operations on components of the converged infrastructure in an abstracted manner without having to be familiar with specific command sets that may be unique from component to component and/or without having to provide access credentials for the component.

Operation 520 may include modifying the configuration of each of the plurality of components to modify the configuration of the converged infrastructure in accordance with the received command.

In some example embodiments, one or more access credentials that may be used to access components of the converged infrastructure may be pre-stored, such as in memory 414 and/or mass storage 418. In such embodiments, the method of FIG. 5 may further include determining any pre-stored access credentials that are associated with the plurality of components determined in operation 510. The method may additionally include using the determined pre-stored access credential(s) to access one or more of the plurality of components to enable performance of operation 520.

Further, as described previously, in some embodiments, a user interface enabling concurrent management of multiple converged infrastructures may be provided. As such, it will be appreciated that, in such embodiments, the method of FIG. 5 may be extended to apply to multiple converged infrastructures. Thus, for example, a user may enter a command to modify a configuration of multiple converged infrastructures and, in turn, configurations of a plurality of components on each of the plurality of converged infrastructures may be modified in order to modify the configuration of the plurality of converged infrastructures in accordance with the command.

FIGS. 6-8 illustrate interactions with and functionality of a CLI that may be provided for managing a converged infrastructure, such as converged infrastructure 102, converged infrastructure 202, and/or converged infrastructure 302, in accordance with some example embodiments. Referring first to FIG. 6, FIG. 6 illustrates an example command line session for modifying a configuration of a converged infrastructure as a single logical entity in accordance with some example embodiments. As illustrated by reference 602, a user may enter a command to disable Telnet on a converged infrastructure, which may be referenced as a single logical entity. In the example of FIG. 6, the command may be vblock.disable_telnet( ), where "vblock" may be an abstracted representation of a Vblock System available from the VCE Company, LLC of Richardson, Tex. It will be appreciated, however, that other command structures may be used to modify a configuration of a converged infrastructure as a singe logical system and/or to perform the functionality of disabling Telnet on a converged infrastructure within the scope of the disclosure. The command that may be entered at reference 602 may, for example, correspond to a command that may be received attendant to performance of operation 510 within the method of FIG. 5 discussed above.

References 604-608 illustrate results of the command to disable Telnet that may be output by the CLI. More particularly, reference 604 illustrates that the configuration of each of the four switches, at addresses 255.255.255.20-255.255.255.23, has been modified to disable Telnet on each of the switches. In particular, it may be seen that prior to executing the command, Telnet was enabled on the switch at 255.255.255.21, but that Telnet is not enabled on the switch following the modification to the configuration of the switch performed in response to the command. Reference 606 illustrates confirmation that Telnet has been disabled on a Unified Computing System (UCS) that may be implemented on the converged infrastructure. Reference 608 provides confirmation that Telnet has been disabled on the converged infrastructure. In this regard, in the example illustrated in FIG. 6, a single command to disable Telnet at the converged infrastructure level may result in Telnet being disabled on each of a plurality of components of he converged infrastructure such that Telnet is disabled on the converged infrastructure as a whole. Accordingly, from the user perspective, the converged infrastructure may be managed as a single logical entity without the user having to manually access and disable Telnet on each switch and UCS of the converged infrastructure. The output of references 604-608 may, for example, correspond to the result of performance of operations 510-520 in which the components of the converged infrastructure on which Telnet may need to be disabled in order to disable Telnet on the converged infrastructure as a whole may be determined and the configuration of the determined components may be modified to disable Telnet on the components.

Reference 610 illustrates an abstracted command to show the Telnet server running on switches of the converged infrastructure. In this regard, the abstracted command may allow a user to reference and access a switch without specifically providing the address of the switch and/or access credentials for the switch. In the example of reference 610, the command may be "switch.run_commands(["show Telnet server"]). However, it will be appreciated that other command structures may be used to provide abstracted commands for operating on components of a converged infrastructure within the scope of the disclosure. The output result of the command shows confirmation that Telnet service is not enabled on the switch, as, in the example of FIG. 6, Telnet has been disabled on the converged infrastructure in response to he command of reference 602.

FIG. 7 illustrates an example command line session for connecting to a component of a converged infrastructure via a user interface in accordance with some example embodiments. In this regard, in accordance with some embodiments, a user may input an abstracted command, such as, by way of non-limiting example, "switch.connect( )," to connect to a component such as a switch without specifically referencing the address of the switch (e.g., 255.255.255.21 in the example of FIG. 7) or providing access credentials for accessing the switch. In the example of FIG. 7, a pre-stored access credential may be used by the CLI to connect to the switch without requesting the user to provide the appropriate access credential.

FIG. 8 illustrates an example of providing a suggested command corresponding to user input in a command line session in accordance with some example embodiments. In the example of FIG. 8, a user may type the letters "sw" into the command line, as illustrated by reference 802. The letters "sw" may form a subset of characters forming a command which the user wishes to enter. In response to receiving the characters "sw" entered by the user, the CLI may determine one or more commands corresponding to the entered characters. In this regard, commands corresponding to the entered characters may include commands including the entered characters, such as commands beginning with the entered characters. The CLI may further present any determined commands to the user as suggested commands. In the example of FIG. 8, the commands "switch" and "switchRest switches" may be presented to the user as suggested commands corresponding to "sw," as further illustrated by reference 802.

In the example of FIG. 8, the user may decide that neither of the suggested commands presented as corresponding to "sw" is the desired command, and may continue to enter further characters until the user has entered "switch.r," as illustrated by reference 804. In response to the entry of additional characters, the CLI may present "switch.reset" and "switchsun_commands" as suggested commands corresponding to "switch.r." The user may, in turn select "switch.run_commands," such as through using tab completion selection and/or other methodology that may be implemented to enable a user to select a suggested command. As further illustrated by reference 804, the user may add a parameter to the command, such as "show Telnet server" and may then enter the command with the CLI outputting the result of the command.

FIG. 9 illustrates an example log of a command line session that may be maintained in accordance with some example embodiments. In this regard, the log file may include a record of all commands entered during a given command line session (or sessions). The log file may, for example, be stored in the memory 414 and/or mass storage 418 such that the log file may be later accessed for audit purposes, to reuse commands, and/or for any other desired purpose.

It will be understood that each block of the flowchart in FIG. 5, and combinations of blocks in the flowchart, may be implemented by various means, such as hardware and/or a computer program product comprising one or more computer readable mediums having computer readable program instructions stored thereon. For example, one or more of the procedures described herein may be embodied by computer program instructions of a computer program product. In this regard, the computer program product(s) which may embody the procedures described herein may be stored by one or more memory devices (e.g., memory 414, mass storage 418, and/or other memory device) of a computing device and executed by a processor in the computing device (e.g., processor 412 and/or other processor). In some embodiments, the computer program instructions comprising the computer program product(s) which embody the procedures described above may be stored by memory devices of a plurality of computing devices. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s). Further, the computer program product may comprise one or more computer readable memories on which the computer program instructions may be stored such that the one or more computer readable memories can cause a computer or other programmable apparatus to function in a particular manner, such that the computer program product comprises an article of manufacture which implements the function specified in the flowchart block(s). The computer program instructions of one or more computer program products may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s). Accordingly, blocks of the flowchart support combinations of means for performing the specified functions. It will also be understood that one or more blocks of the flowchart, and combinations of blocks in the flowchart, may be implemented by special purpose hardware-based computer systems which perform the specified functions, or combinations of special purpose hardware and computer program product(s).

Moreover, it will be appreciated that the ordering of blocks and corresponding method operations within the flowchart is provided by way of non-limiting example in order to describe operations that may be performed in accordance some example embodiments. In this regard, it will be appreciated that the ordering of blocks and corresponding method operations illustrated in the flowchart is non-limiting, such that the ordering of two or more block illustrated in and described with respect to the flowchart may be changed and/or method operations associated with two or more blocks may be at least partially performed in parallel in accordance with some example embodiments. Further, in some embodiments, one or more blocks and corresponding method operations illustrated in and described with respect to the flowchart may be optional, and may be omitted.

Functions in accordance with the above described embodiments may be carried out in many ways. In this regard, any suitable means for carrying out each of the functions described above may be employed to carry out various embodiments. In some embodiments, a suitably configured processor (e.g., processor 412) may provide all or a portion of the elements. In other embodiments, all or a portion of the elements may be configured by and operate under control of a computer program product. The computer program product for performing the methods of various embodiments of includes at least one computer readable storage medium having computer readable program code stored thereon. The computer readable medium (or media) may, for example, be embodied as and/or otherwise include the memory 414 and/or mass storage 418. However, it will be appreciated that a computer program product in accordance with various example embodiments may include any data storage device (e.g., a non-transitory computer readable storage medium) that can store data, which can be thereafter read by a computer system. Examples of the computer readable storage media include hard drives, network attached storage (NAS), read-only memory, random-access memory, one or more digital versatile disc (DVDs), one or more compact disc read only memories (CD-ROMs), one or more compact disc-recordable discs (CD-Rs), one or more compact disc-rewritable discs (CD-RWs), one or more Blu-Ray discs, magnetic tapes, flash memory, some combination thereof, and/or other optical and non-optical data storage devices. Some example embodiments may additionally or alternatively use computer readable storage media distributed over a network coupled computer system such that the computer readable code may be stored and executed in a distributed fashion.

Embodiments utilizing a computer program product and/or otherwise employing various computer-implemented operations may employ operations involving data stored in computer systems. These operations include those requiring physical manipulation of physical quantities. In some instances, though not all, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. Moreover, it will be appreciated that a non-transitory computer readable storage medium storing program instructions configured to carry out operations in accordance with one or more embodiments constitutes an article of manufacture.

The disclosed embodiments also relate to a device or an apparatus for performing these operations. The apparatus may be specially constructed to perform a particular embodiment(s), or the apparatus can be a general-purpose computer selectively activated or configured by a computer program stored in and/or otherwise accessible by the computer such that the general-purpose computer is configured to perform operations in accordance with one or more embodiments.

Embodiments described herein may be practiced with various computer system configurations including blade devices, cloud systems, converged infrastructure systems, rack mounted servers, switches, storage environments, hand-held devices, tablets, microprocessor systems, microprocessor-based or programmable consumer electronics, minicomputers, mainframe computers and the like. Some embodiments may also be practiced in distributed computing environments where tasks are performed by remote processing devices that are linked through one or more networks, such as one or more wireline networks and/or one or more wireless networks.

Many modifications and other embodiments of the inventions set forth herein will come to mind to one skilled in the art to which these disclosed embodiments pertain having the benefit of the teachings presented in the foregoing descriptions and the associated drawings. Therefore, it is to be understood that embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure. In this regard, for example, different combinations of elements and/or functions than those explicitly described above are also contemplated within the scope of the disclosure. Although specific terms are employed herein, they are used in a generic and descriptive sense only and not for purposes of limitation.

It should be understood that although the terms first, second, etc. may be used herein to describe various steps or calculations, these steps or calculations should not be limited by these terms. These terms are only used to distinguish one operation or calculation from another. For example, a first calculation may be termed a second calculation, and, similarly, a second step may be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

What is claimed is:

1. A method for enabling management of a computing system including a plurality of computing, network and storage components that are separately and independently accessible, and that are mapped to a hierarchical tree, the method comprising:
    receiving a command to modify a configuration of the computing system that does not individually identify any computing, network or storage components of the plurality of computing, network and storage components of the computing system;
    determining computing, network and storage components of the plurality of computing, network and storage components whose configurations need to be modified in order to modify the configuration of the computing system in accordance with the command;
    determining, based at least in part on the command, a launch point within the hierarchical tree to execute an operation to modify configuration of at least one of the plurality of computing, network and storage components; and
    separately and independently modifying the configuration of each of the computing, network and storage components whose configurations need to be modified to modify the configuration of the computing system as a single logical entity, in accordance with the command, including executing the operation to modify configuration of the at least one of the plurality of computing, network and storage components at the determined launch point, wherein at least one method operation is performed by a processor.

2. The method of claim 1, wherein the command comprises an abstracted command referencing a type of component, and wherein the plurality of computing, network and storage components comprise a plurality of the components of the type.

3. The method of claim 1, wherein the command comprises a command entered to a user interface configured to enable a user to manage the computing system through a set of abstracted commands enabling management of the computing system as a single logical entity.

4. The method of claim 1, further comprising:
    determining a pre-stored access credential associated with at least one of the plurality of computing, network and storage components; and
    using the determined pre-stored access credential to access the at least one of the plurality of computing, network and storage components prior to modifying the configuration of the at least one of the plurality of computing, network and storage components.

5. The method of claim 1, wherein the command comprises a command entered via a command line interface (CLI).

6. The method of claim 5, further comprising:
    receiving one or more characters entered via the CLI, wherein the one or more characters comprises a subset of characters forming the command;
    determining a command corresponding to the one or more characters; and
    presenting the determined command to the user as a suggested command;
    wherein receiving the command comprises receiving a selection of the suggested command.

7. The method of claim 1, further comprising: receiving an indication of a command selected from a plurality of selectable commands on a graphical user interface (GUI), wherein the command is the command selected from the plurality of selectable commands.

8. The method of claim 1, wherein:
    the command comprises a command to modify a configuration of each of a plurality of computing systems; and
    determining the plurality of computing, network and storage components comprises determining a plurality of computing, network and storage components on each of the plurality of computing systems whose configurations need to be modified in order to modify the configuration of the plurality of computing systems in accordance with the command.

9. A system for enabling management of a computing system including a plurality of computing, network and storage components that are separately and independently accessible, and that are mapped to a hierarchical tree, the system comprising:
    at least one processor; and
    at least one memory storing computer program code, wherein the at least one memory and stored computer program code are configured, with the at least one processor, to cause the system to at least:
    receive a command to modify a configuration of the computing system that does not individually identify any computing, network or storage components of the plurality of computing, network and storage components of the computing system;
    determine computing, network and storage components of the plurality of computing, network and storage components whose configurations need to be modified in order to modify the configuration of the computing system in accordance with the command;
    determine, based at least in part on the command, a launch point within the hierarchical tree to execute an operation to modify configuration of at least one of the plurality of computing, network and storage components; and
    separately and independently modify the configuration of each of the computing, network and storage components whose configurations need to be modified to modify the configuration of the computing system as a single logical entity, in accordance with the command, including the system caused to execute the operation to modify configuration of the at least one of the plurality of computing, network and storage components at the determined launch point.

10. The system of claim 9, wherein the command comprises an abstracted command referencing a type of component, and wherein the plurality of computing, network and storage components comprise a plurality of the components of the type.

11. The system of claim 9, wherein the command comprises a command entered to a user interface configured to enable a user to manage the computing system through a set of abstracted commands enabling management of the computing system as a single logical entity.

12. The system of claim 9, wherein the at least one memory and stored computer program code are configured, with the at least one processor, to further cause the system to:
  determine a pre-stored access credential associated with at least one of the plurality of computing, network and storage components; and
  use the determined pre-stored access credential to access the at least one of the plurality of computing, network and storage components prior to modifying the configuration of the at least one of the plurality of computing, network and storage components.

13. The system of claim 9, wherein the command comprises a command entered via a command line interface (CLI).

14. The system of claim 9, wherein the at least one memory and stored computer program code are configured, with the at least one processor, to further cause the system to:
  receive an indication of a command selected from a plurality of selectable commands on a graphical user interface (GUI), wherein the command is the command selected from the plurality of selectable commands.

15. A computer program product for enabling management of a computing system including a plurality of computing, network and storage components that are separately and independently accessible, and that are mapped to a hierarchical tree, the computer program product comprising at least one non-transitory computer-readable storage medium having program instructions stored thereon, which when executed by at least one processor, cause the at least one processor to perform a method comprising:
  receiving a command to modify a configuration of the computing system that does not individually identify any computing, network or storage components of the plurality of computing, network and storage components of the computing system;
  determining computing, network and storage components of the plurality of computing, network and storage components whose configurations need to be modified in order to modify the configuration of the computing system in accordance with the command;
  determining, based at least in part on the command, a launch point within the hierarchical tree to execute an operation to modify configuration of at least one of the plurality of computing, network and storage components; and
  separately and independently modifying the configuration of each of the computing, network and storage components whose configurations need to be modified to modify the configuration of the computing system as a single logical entity, in accordance with the command, including executing the operation to modify configuration of the at least one of the plurality of computing, network and storage components at the determined launch point.

16. The computer program product of claim 15, wherein the method further comprises:
  determining a pre-stored access credential associated with at least one of the plurality of computing, network and storage components; and
  using the determined pre-stored access credential to access the at least one of the plurality of computing, network and storage components prior to modifying the configuration of the at least one of the plurality of computing, network and storage components.

* * * * *